United States Patent
Ulrich et al.

(12)

(10) Patent No.: US 7,017,800 B2
(45) Date of Patent: Mar. 28, 2006

(54) WORKPIECE WITH A MACHINE-READABLE DATA CARRIER

(75) Inventors: Christoph H. Ulrich, Teufen (CH); Lukas Giovanettoni, Wil (CH)

(73) Assignee: Ulrich AG, (CH)

(*) Notice: Subject to any disclaimer, the term of this patent is extended or adjusted under 35 U.S.C. 154(b) by 99 days.

(21) Appl. No.: 10/466,687

(22) PCT Filed: Dec. 14, 2001

(86) PCT No.: PCT/CH01/00715

§ 371 (c)(1),
(2), (4) Date: Oct. 28, 2003

(87) PCT Pub. No.: WO02/061665

PCT Pub. Date: Aug. 8, 2002

(65) Prior Publication Data

US 2004/0099724 A1    May 27, 2004

(30) Foreign Application Priority Data

Jan. 30, 2001   (EP) ................... 01810084

(51) Int. Cl.
*G06F 17/00* (2006.01)

(52) U.S. Cl. ....................... 235/375; 235/487
(58) Field of Classification Search .......... 235/462.01, 235/462.08, 492.09, 454, 470, 487, 375, 235/376

See application file for complete search history.

(56) References Cited

U.S. PATENT DOCUMENTS

| | | | | |
|---|---|---|---|---|
| 4,791,284 A | * | 12/1988 | Ludden | 235/487 |
| 4,939,354 A | | 7/1990 | Priddy et al. | |
| 4,989,483 A | * | 2/1991 | Lacrouts-Cazenave | 83/76.9 |
| 5,374,813 A | * | 12/1994 | Shipp | 235/375 |
| 5,443,082 A | * | 8/1995 | Mewburn | 128/897 |
| 5,554,841 A | * | 9/1996 | Kost et al. | 235/494 |
| 5,637,850 A | * | 6/1997 | Honda | 235/454 |
| 5,971,130 A | | 10/1999 | Nakamura | |
| 5,996,889 A | * | 12/1999 | Fuchs et al. | 235/375 |
| 6,004,405 A | | 12/1999 | Oishi et al. | |
| 6,256,121 B1 | * | 7/2001 | Lizotte et al. | 359/15 |

FOREIGN PATENT DOCUMENTS

| | | |
|---|---|---|
| DE | 39 17 876 A1 | 12/1990 |
| WO | 96/03714 | 2/1996 |
| WO | 00/57336 | 9/2000 |

* cited by examiner

*Primary Examiner*—Ahshik Kim
(74) *Attorney, Agent, or Firm*—Nath & Associates PLLC; Gregory B. Kang; Teresa M. Arroyo

(57) ABSTRACT

The invention relates to work pieces (2), such as surgical instruments provided with a machine-readable data carrier (1). Said data support contains a data section (3) with individual cavities (4) arranged therein, forming a two-dimensional matrix code (5). The cavities exhibit a particular advantage in that they are machine-cut, especially by means of boring. Damage causing structural alterations to the material occurring when a code is burnt in by means of laser radiation can be reduced in a reliable manner. The contrast effect of the cavities is sufficient and the data support is particularly resistant to mechanical influences.

15 Claims, 4 Drawing Sheets

WORKPIECE WITH A MACHINE-READABLE DATA CARRIER

Figure 1:
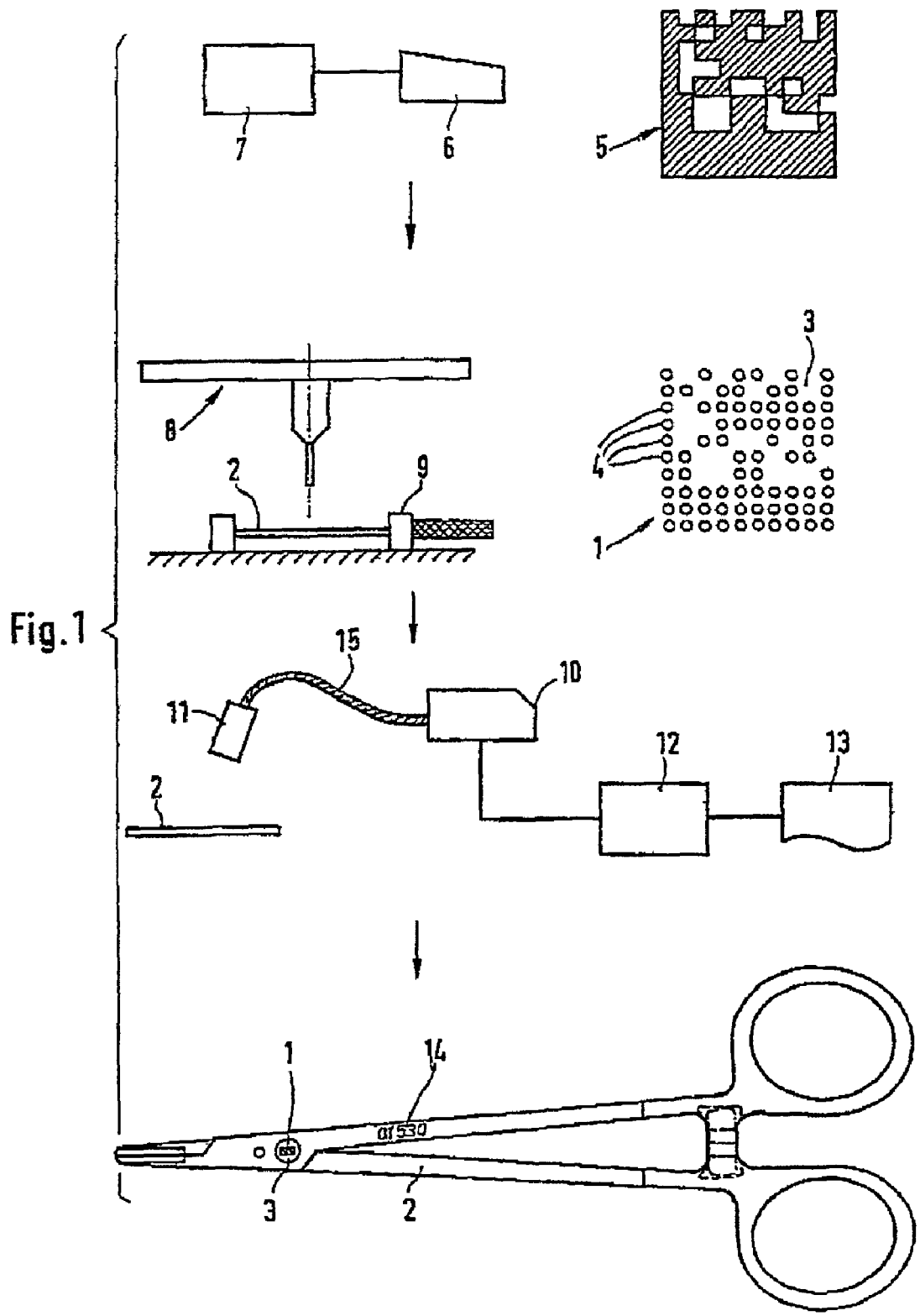

The invention relates to a method for putting a machine-readable data storage medium on a workpiece, particularly on a surgical instrument. The aim of this is to mark this work tool in order to monitor and possibly to control its use.

Data storage media in widespread use, particularly in the medical field, are the "bar code", whose data can be recorded using a bar code reader. Thus, by way of example, DE A 39 17 876 has already described a system for loading a surgical instrument set in which each instrument carries a data storage medium in the form of a bar code. Since printed bar codes on such instruments are not suitable for various reasons, it is recommended that the bar code be engraved into the metal material of the instrument using a laser beam.

A fundamental drawback of the bar code with a linear orientation is the limited capacity of the volume of data which can be stored. In addition, the linear orientation needs to be taken into account during scanning, which presupposes appropriate positioning. In machine-readable data storage medium technology, various two-dimensional matrix codes have therefore already been developed whose storage capacity is much greater, with the position of the code during reading being of no significance. Such a matrix code is described in CH A 679 084, for example. This code is also known and introduced by the name "Data Matrix Code".

Examples of two-dimensional matrix codes are described in U.S. Pat. No. 5,637,850 or in WO 96/03714. In both cases, the machine-readable data storage medium is produced by specifically producing a particular surface structure. This is done using electroerosive or laser processes, in particular.

U.S. Pat. No. 5,971,130 has disclosed an extremely simple version of a data storage medium which comprises adjacent openings which can be measured by a mechanical scanning apparatus. However, this system is suitable only for larger workpieces such as steel sheets or the like and cannot be used for surgical instruments.

A considerable problem when putting on data storage media using laser beams or electroerosion is that the molecular structural changes initiated thereby in a metal alloy can result in rusting at a later time. In addition, the surface depth of the marking is small enough for damage to occur over time as a result of mechanical action, which results in reading errors. It is therefore an object of the invention to provide a method of the type mentioned initially which allows an easily readable data storage medium to be put on the smallest space such that it remains on the work tool permanently and without any damaging action on the material. The invention achieves this object by means of a method having the features of claim 1.

In a surprisingly simple manner, the invention makes use of the fact that, with a two-dimensional matrix code, the type of contrast formation on the individual matrix points is of no significance and that readability is still ensured even with a relatively low contrast level. The depressions therefore likewise produce an adequate contrast effect, because they are sufficiently different than the planar surfaces of the data section in vertical illumination. Even under severe mechanical stress, such as where the instruments run against one another, the depressions remain fully intact and have no problems on a bacteriological level. When drilling or milling, the surface structure is not impaired as in the case of the high level of thermal loading as a result of laser marking or electroerosion.

When making the depressions, the material of the workpiece naturally plays a significant part. Surgical instruments are normally made of stainless steel. Alternatively, work tools made of lightweight metal, nonferrous metal, ceramic or plastic can be processed using the inventive method. The expression "workpiece" incidentally covers not just work tools in the actual sense of the word, such as scissors, scalpels etc. but also other markable parts, such as certain implants etc.

In certain cases, alternative work methods for making the depressions would also be conceivable, such as embossing using an embossing tool. With regard to the possible large number of tools required for each individual code, there are set limits, however, unless the tools can each be adjusted for different codes. It has therefore been found to be particularly advantageous to make the depressions using a cutting work process, particularly by drilling or milling.

Drill holes can be made with a high level of precision using a computer-controlled coordinate drill.

Before the depressions are made, the data section is advantageously put on the workpiece as a planar surface. Such a planar surface forms a reference level with the same conditions for all the depressions, regardless of the nature of the rest of the workpiece surface. The planar surface can be made by milling or grinding, for example. If the planar surface is set back from the adjacent workpiece surface, this affords further protection for the data storage medium against mechanical action. In addition, it makes it easier to identify the actual location of the data section, which simplifies reading in.

Finally, a high level of operational safety is achieved by putting an alphanumeric code on the workpiece in addition to the matrix code. This allows visual identification of the workpiece even when a reader is not available or when machine readability is not possible for other reasons.

To make the depressions, the workpiece is advantageously clamped in a clamping apparatus in order first to mill the data section out of the workpiece as a planar surface. Next, the depressions are drilled using a computer-controlled coordinate drill. The matrix code is checked using a reader while the workpiece is in the clamped state, with milling of the planar surface, drilling of the depressions and the check needing to be repeated if the code cannot be identified.

It is particularly advantageous if the depressions are drilled so as to be rotationally symmetrical with a preferably conical section whose cross section tapers toward the base of the depressions. The cone surface brings about an excellent contrast effect for visual detection, or when lit up in vertical illumination. The incident beams of light are apparently reflected by the cone surfaces differently than on the planar surface, as a result of which the depressions appear as dark circles.

The invention also relates to a workpiece or work tool, particularly a surgical instrument, having a machine-readable data storage medium which has the features in claim 6.

The depressions are advantageously in rotationally symmetrical form, which is automatically obtained during drilling. Polygonal depressions are readily conceivable, however, particularly when embossing tools are used to produce them. It is also advantageous if the cross section of the depressions has a preferably frustoconical or conical section which tapers toward the base. The annular conical envelope surface increases the contrast effect according to the incidence of light. In this case, the tapering section can have an angle of aperture of between 80° and 120°, for example.

Depending on the resolution level of the reader and on the work engineering used, there are virtually no limits set for miniaturization of the matrix code. However, it is possible to achieve an optimum data density if the depressions at the level of the data section have a diameter of less than 0.15 mm and a spacing between the centers of less than 0.2 mm. The matrix code can extend to the two axes on a square or rectangular area. The distance between the base of the depressions and the level of the data section, that is to say the actual drilling depth, is advantageously less than 0.05 mm. An optimum contrast effect is ensured in this case without cleaning of the depressions presenting a problem.

The planar surface preferably set back from the adjacent workpiece surface can likewise have different configurations. The outline can be circular or oval, which results from milling anyway.

A data storage medium produced in accordance with the invention on a workpiece is read particularly advantageously using a method in which the optical axis of a camera's read head is directed toward the data storage medium or toward the planar surface, with illumination coming via the read head's lens.

The reader for reading in a data storage medium in accordance with the invention is advantageously characterized by a read head having central illumination incorporated in the optical axis. This means that another angle of radiation is achieved on the conical envelope surfaces of the depressions, which the camera records as an annular contrast. Depending on the type of depression, it would also be conceivable for the optical axis to be surrounded by annular illumination, however.

A workpiece marked in accordance with the invention is particularly advantageously suited to use in a method for monitoring workpieces, particularly surgical instruments. Particularly in the medical field, such a method allows a large number of different functions and properties. Work sequences are simplified thereby and optimum quality management is ensured. Business management data can also be constantly monitored and queried using the matrix code. A method comparable to the generic concept has been disclosed in WO 00/57336, for example. However, the marking in that case is likewise made by laser radiation, etching or superficially by an ink-jet method. Such marked hospital instruments are subject to enormous stress, for example during sterilization, which means that the data storage media become worn relatively quickly and that reading errors occur ever more frequently over the course of time.

Typical work sequences in hospital are, by way of example, the creation and checking of "strainer schedules" for sterilizing entire instrument sets, as described in DE A 39 17 876 mentioned in the introduction, for example. The sterilization procedure itself can also be controlled using the matrix code, for example by virtue of an admissible sterilization temperature or sterilization time being selected automatically.

Another work sequence is the provision of the instruments for reconditioning and/or repair. Thus, by way of example, a particular instrument, for example a chisel, can be identified and removed for resharpening after a particular number of uses, with all the data relevant for retreatment being able to be printed in the form of a log.

In the field of quality management, it is likewise possible to form different monitoring tasks, particularly the complete traceability of all work sequences, the monitoring of expiry dates following sterilization, the number of sterilizations per instrument and much more.

In the field of business management data, it is possible to monitor the costs or the inventory value of an instrument, for example. It is also possible to budget for future costs or possible new purchase.

Figure 2:
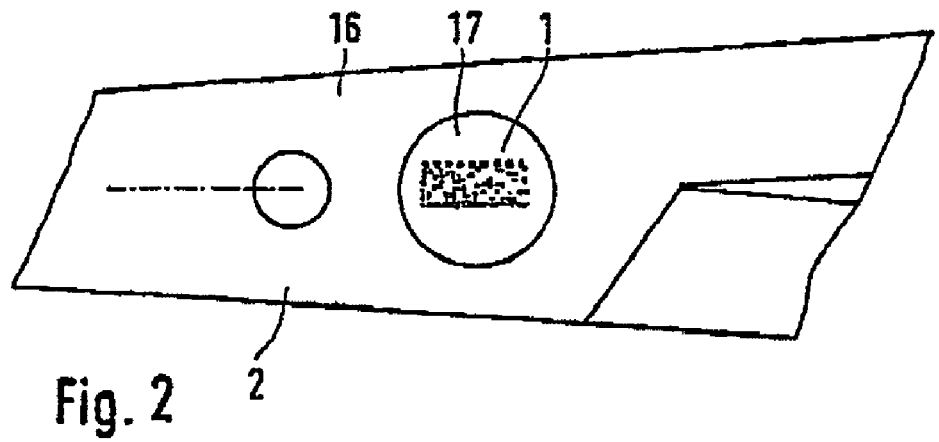
Figure 3:
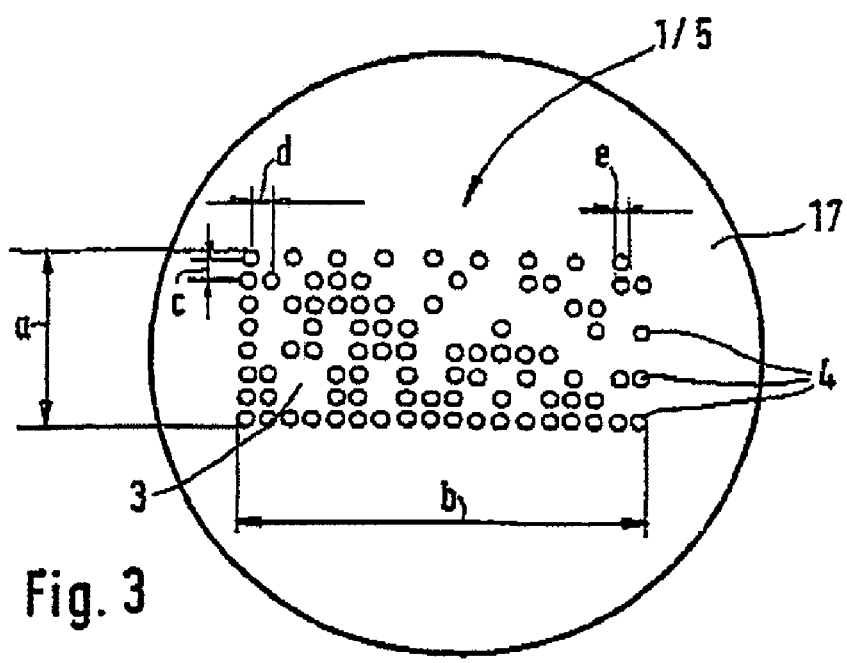
Figure 4:
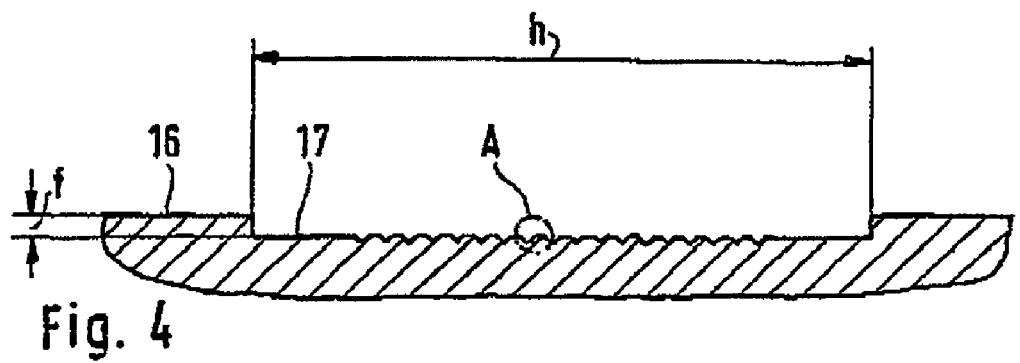
Figure 5:
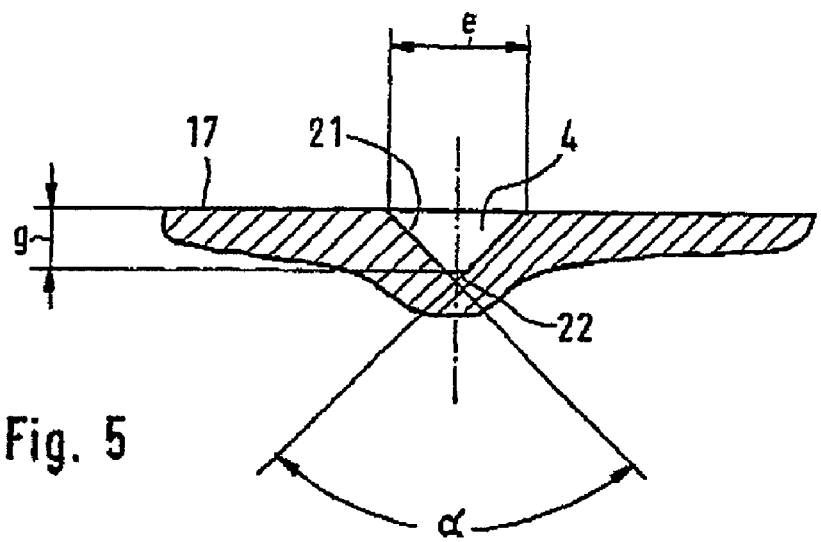
Figure 6:
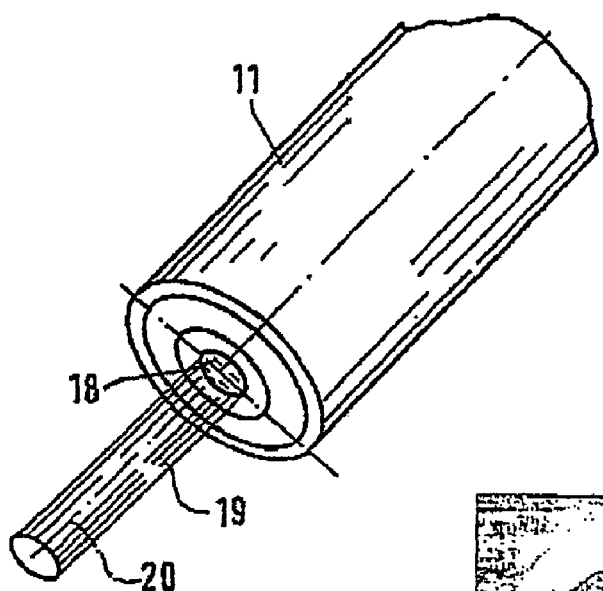
Figure 7:
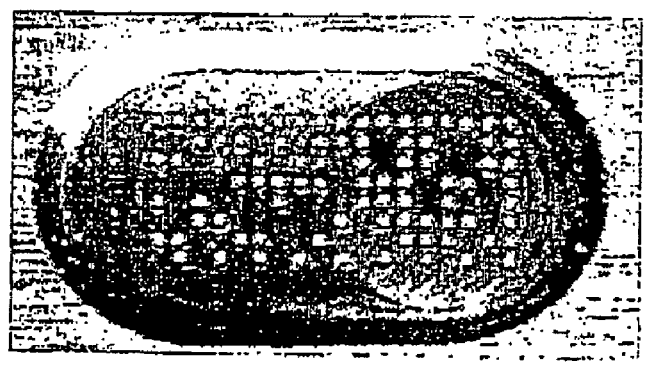
Figure 8:
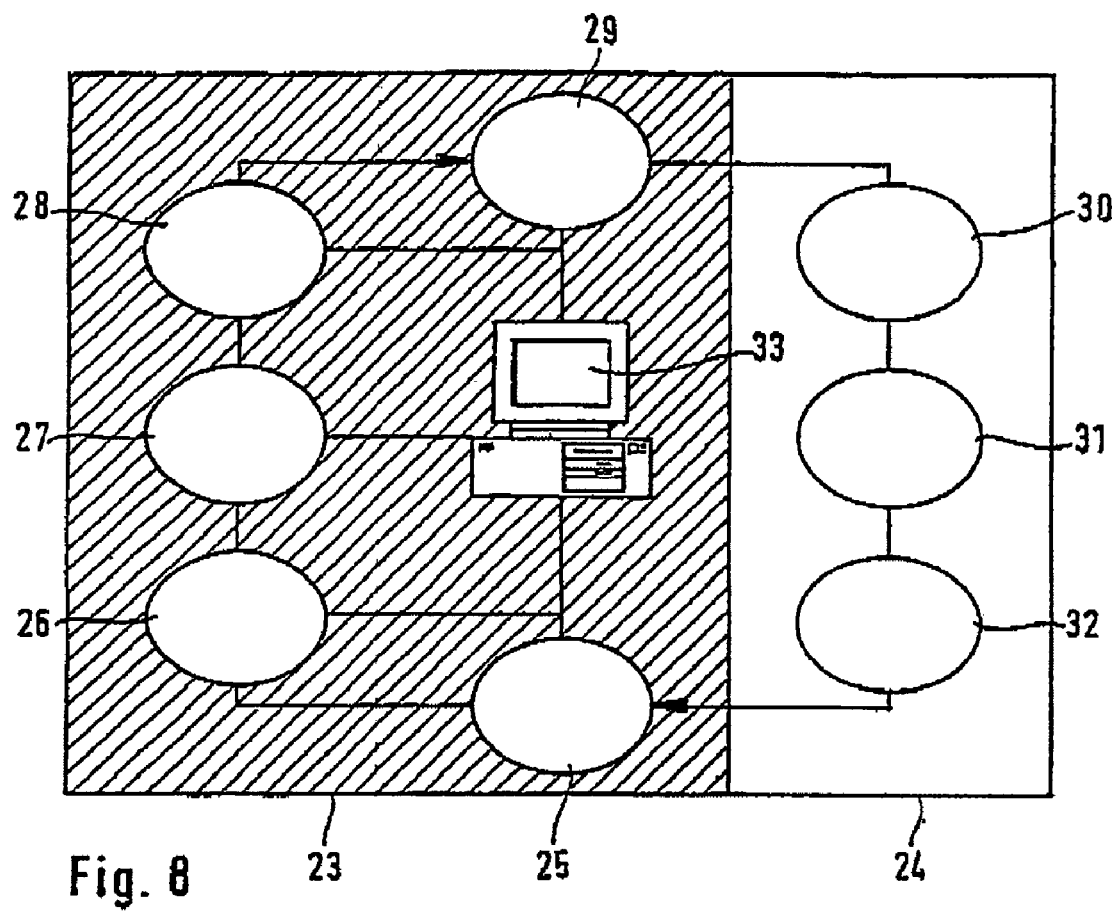
Figure 9:
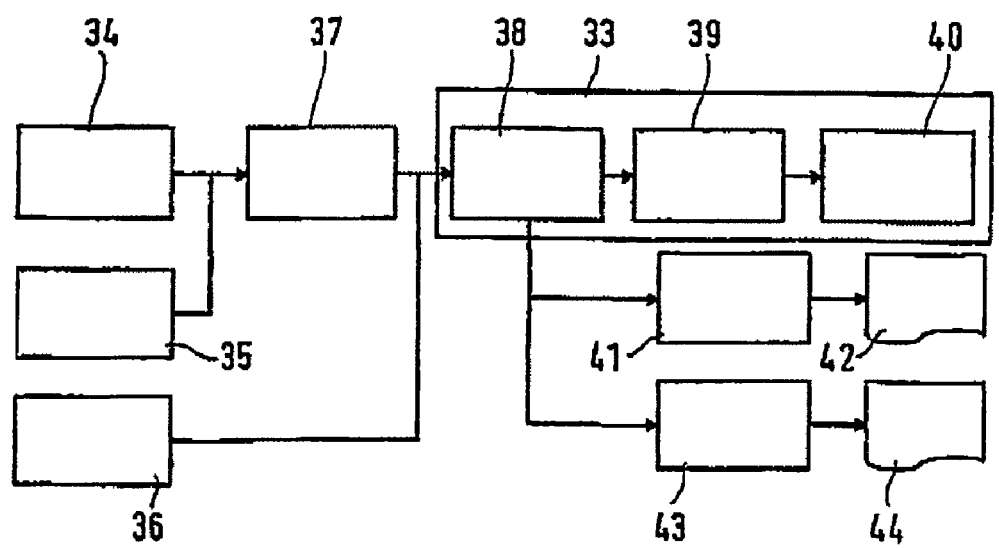

Other advantages and individual features of the invention can be found in the description below of exemplary embodiments and in the drawings, in which:

FIG. 1 shows a highly schematic illustration of a work sequence for putting on a data storage medium, FIG. 2 shows a greatly enlarged plan view of a data storage medium on a surgical instrument, FIG. 3 shows an even more enlarged illustration of the data storage medium shown in FIG. 2, FIG. 4 shows a cross section through the data storage medium shown in FIG. 3, FIG. 5 shows the detail A shown in FIG. 4 in a greatly enlarged illustration, FIG. 6 shows a perspective illustration of a read head, FIG. 7 shows an image of a data storage medium taken using a digital camera, FIG. 8 shows a diagram showing the use cycle of surgical instruments, and FIG. 9 shows a diagram showing data capture on surgical instruments.

As FIG. 1 shows, the procedure for putting a machine-readable data storage medium on a surgical instrument 2, for example, is as follows:

Following definition of the data which are to be stored, these data are entered on the input console 6 of a matrix computer 7 in the form of an alphanumeric code. In a manner which is not presented in any more detail at this point, the matrix computer determines the matrix code 5, comprising light and dark fields on the matrix.

This binary code is used to control a coordinate drill 8 on which the work tool 2 is firmly clamped in a clamping apparatus 9. On the basis of the matrix code 5, drill holes 4 are made which together form the data storage medium 1. As the comparison shows, each dark field of the matrix code has a corresponding drill hole 4 which gives the same contrast effect opposite the surface of the data section 3 as coloration of the surface.

Before the drill holes are made, the data section 3 is preferably milled out of the work tool 2 as a planar reference surface 17 (FIG. 2). This operation can likewise be performed in the drill 8 or else in a separate work step on another machine. This ensures that the matrix code is always put on a planar surface, in order to avoid reading errors.

Before the work tool 2 is removed from the clamping apparatus 9, the matrix code is read in with a reader 10 which is connected to a read head 11 by means of a flexible data line 15 in a manner which is known per se. The reader 10 is connected to a data processing installation 12 storing the various matrix codes. If the read operation is successful, i.e. if the code is recognized, the stored data for the work tool in question are complemented, by way of example, by the day's date for producing the data storage medium, after which a log 13 can be printed. If the code is not identified, milling of the planar surface and the drilling operation may need to be repeated.

The finished surgical instrument 2 is shown in FIG. 1 approximately to the original scale. The data storage medium 1 can evidently be accommodated on a very small space. Preferably, in addition to the matrix code, an alphanumeric code 14 is also engraved or is put on in another way. Identification of the work tool is thus not exclusively dependent on the reader.

FIGS. 2 to 5 show further details of the inventive data storage medium. The aforementioned planar surface 17 is made in the form of circular milling in the tool surface 16, for example. The milling depth f, i.e. the distance between the tool surface 16 and the planar surface 17, is very small in this case and is only between 0.1 and 0.2 mm, for example. If the tool surface 16 has a convex or concave curvature, for example, the planar surface 17 can coincide approximately with the tool surface 16 at individual points. The diameter h of the milling is 4 mm, for example.

FIG. 3 shows dimensional details of the data storage medium 1, which in this case is in the form of a rectangle. The height a and the width b roughly correspond to the ratio 1:2, with the outermost limb of the matrix respectively being drilled continuously in each direction. This is important for the positional identification of the matrix code. The individual drill holes 4 have, at the level of the planar surface 17, a diameter e of 0.1 mm, for example, while the spacing c and d between the centers is approximately 0.15 mm.

There is no technical problem in making very fine drill holes on a narrow space. Comparable processing methods are known in the watchmaking industry, for example.

Finally, FIG. 5 shows another drill hole or a depression 4 in greatly enlarged cross section. The drilling depth g, i.e. the distance between the planar surface 17 and the base 22 of the drill hole, is extremely small and is between 0.04 mm and 0.05 mm, for example. It has been found that the best results in terms of the contrast effect can be attained with a conical drill hole. The conical envelope surface 21 in this case has an angle of aperture a of 90° or else more than 90°, for example. In addition, the envelope surface 21 intersects the planar surface 17. The envelope surface 21 reflects incident light at a different angle than the planar surface 17, or than the drill hole base 22, which produces a particularly advantageous contrast effect. This effect is enhanced by illumination which runs in the camera's optical axis as far as possible.

The end face of a read head 11, as shown in greatly enlarged form in FIG. 6, has a lens 18 on the optical axis 20. For optimum illumination, it is expedient for the light beam 19 from the illumination to pass through the lens. To this end, the light can be reflected into the optical axis. The light beam from the illumination can be a permanent light beam. Under certain conditions, particularly with regard to digitization of the image and to the camera used, it can also be expedient to use stroboscopic light for illumination, however.

FIG. 7 shows a greatly enlarged illustration of an image of a data storage medium taken using a digital camera. In this case, the depressed planar surface is in oval form and has a length of 4 mm and a width of 2 mm. The conical drill holes can clearly be seen on the light planar surface in the form of dark rings. The slight irregularities on the outer circumference are caused by microscopically small material eruptions in the drilling area. The contrast effect is entirely adequate for immediate recognition of the matrix code by a suitable camera, however.

The text below explains a couple of typical opportunities for use of the inventive data storage medium, using the example of surgical instruments. The aim in this context is to design an information system for all operations concerning these instruments which is as complete as possible. Naturally, comparable information systems in other fields are easily conceivable, however. Thus, by way of example, hand tools and machine tools in a factory, for example, could be identified and detected.

FIG. 8 shows a typical instrument cycle in a hospital, where the shaded area 23 symbolizes the actual area of use and the area 24 symbolizes the area for re-conditioning. In the center of the various use actions, there is a data processing installation 33 which is provided with new data by virtue of the matrix code being read in on various workstations. Following a function check 25 on the instruments, they are released for strainer packing 26. Instruments which are not functional are removed and are sent to reconditioning (see FIG. 10). Packing the strainer baskets in the form of sets prior to sterilization is an important operation, because this is at the actual point at which the correct packing order and compilation of the strainer with the individual instruments are defined. During the actual strainer packing, it is possible to perform checking functions using the data storage media by preprogramming the computer with particular strainer compilations. If an instrument is missing or if the strainer has an incorrect instrument added to it, a corresponding display is shown in the data processing device.

The subsequent sterilization 27 produces likewise determined operating data for the sterilization process, duration, temperature, pressure etc. which in turn can be supplied to the computer 33 as supplementary data. Conversely, it is also conceivable to control the sterilization using the computer 33 on the basis of the instruments supplied to the sterilization process.

The movement 28 of the instruments generates data about the location of the sterilized instruments and hence about the current availability. Finally, the data about use 29 of the instruments are also of greatest importance for tracing, where it is possible to record precisely which instrument has been used at which time on which patient during which operation, for example.

In the re-conditioning area 24, the instruments are first returned 30, possibly following decontamination. This is followed by washing 31 and possibly maintenance 32 which is dependent on the type of instrument, before the cycle begins again.

FIG. 9 shows the important data contained in the matrix code and the data which are archived and logged in the data processing device 33. Of the various master data, the article-related master data 34 which individualize the instrument are most important. The clinic-related master data 35 identify the location and/or the owner of the instruments. The person-related master data 36 individualize the doctor who uses the instruments, for example. Finally, the master data relating to the strainer schedules 37, i.e. the information about the various instruments put into the strainers, are also important. Such strainer schedules need to be created before the information system is implemented in the hospital.

The assignment of the strainer contents and the movement of the instruments form an information block 38, which is at the start of the cycle shown in FIG. 8. Instruments which can no longer be used are sent to reconditioning 41, where a repair form 42 can be printed. The order 43 for reconditioning together with the order form 44 can also be generated using the data processing device.

Next, the instruments which can be used go for strainer packing, where a data block 39 is documented. Similarly, the strainer's assignment to the desired location is recorded as a data block 40.

The user of the work tool, that is to say for example the hospital, and the manufacturer can particularly advantageously interchange data in order to manage reconditioning of the instruments. The manufacturer of the instrument has all article-related master data or all data relating to previous use of the instrument, its age etc. If the hospital requests reconditioning (items 43 and 44 in FIG. 8), the manufacturer can use the available data records or the data records transmitted to him for his in-house procedures. These data records are complemented by the parameters for the reconditioning.

What is claimed is:

1. A method for putting a data storage medium (1), which is machine-readable by optical detection on a surgical instrument, where a data section (3) contains individual depressions (4) which form a total of one two-dimensional matrix code, characterized in that the depressions are made by a cutting work process, using drilling, excluding laser cutting or electro-erosive cutting, so as to be rotationally symmetrical with a section whose cross section tapers toward the base (22) of the depression, and the data section (3) is put on the work tool (2) as a planar surface (17) which is set back from the adjacent workpiece surface before the depressions (4) are made.

2. The method as claimed in claim 1, characterized in that, in addition to the matrix code, an alphanumeric code (14) is put on the surgical instrument.

3. The method as claimed in claim 1, characterized in that the depressions (4) have a conical or truncated section.

4. The method as claimed in claim 1, characterized
a) in that the surgical instrument (2) is clamped in a clamping apparatus (9),
b) in that the data section is first milled out of the surgical instrument as a planar surface (17),
c) in that the depressions (4) are then drilled using a computer-controlled coordinate drill (8),
d) in that the matrix code is checked using a reader (10) while the surgical instrument is in the clamped state, and
e) in that work steps b, c and d are repeated if the code cannot be identified.

5. A surgical instrument having a data storage medium (1), which is machine-readable by optical detection and which is in the form of a two-dimensional matrix code (5) in the form of individual depressions (4), in a data section (3), characterized in that the depressions (4) are made by a cutting work process, using drilling, excluding laser cutting or electro-erosive cutting, in a planar surface (17) which is set back from the adjacent surgical instrument surface, and the depressions (4) are in rotationally symmetrical form with a section whose cross section tapers toward the base (22) of the depression.

6. The surgical instrument as claimed in claim 5, characterized in that the depressions (4) have a truncated or conical section (21).

7. The surgical instrument as claimed in claim 5, characterized in that the tapering section (21) intersects the planar surface (17).

8. The surgical instrument as claimed in claim 5, characterized in that the tapering section (21) has a cone angle ($\alpha$) of between 80° and 120°.

9. The surgical instrument as claimed in claim 5, characterized in that the depressions (4) at the level of the planar surface (17) have a diameter (e) of less than 0.15 mm and a spacing (c, d) between the centers of less than 0.2 mm.

10. The surgical instrument as claimed in claim 6, characterized in that the distance (g) between the base (22) of the depression and the level of the planar surface (17) is less than 0.05 mm.

11. A method for reading a data storage medium, which is machine-readable by optical detection, on a surgical instrument which is in the form of a two-dimensional matrix code (5) in the form of individual depressions (4) in a data section (3), and the depressions are made by a cutting work process, using drilling, excluding laser cutting or electro-erosive cutting, in a planar surface (17) which is set back from the adjacent surgical instrument surface, and the depressions (4) are in rotationally symmetrical form with a section whose cross section tapers toward the base (22) of the depression, characterized in that the optical axis of a camera's read head is directed toward the data storage medium (1) or toward the planar surface (17), with the illumination coming via the read head's lens in the optical axis.

12. The use of surgical instruments, having a data storage medium, which is machine-readable by optical detection, which is in the form of a two-dimensional matrix code (5) in the form of individual depressions (4) in a data section (3), and the depressions are made by a cutting work process, using drilling, excluding laser cutting or electro-erosive cutting, in a planar surface (17) which is set back from the adjacent surgical instrument surface, and the depressions (4) are in rotationally symmetrical form with a section whose cross section tapers toward the base (22) of the depression, in a monitoring process in which each instrument is allocated a unique data storage medium which contains master data identifying the instrument, where the master data are recorded in a data processing device (33), whenever the instrument is used, the data storage medium is read in and the master data recorded in the process, supplemented with use-specific data, are in turn stored together as actual data in the data processing device, the data processing device compares the stored actual data with nominal data which are likewise stored, and predetermined parameters are taken as a basis for producing a display relating to the state of the instrument.

13. A surgical instrument having a machine-readable data storage medium (1) which is in the form of a two-dimensional matrix code (5) in the form of individual depressions (4) in a data section (3), characterized in that the depressions are made by a cutting work process, using drilling or milling, in a planar surface (17) which is set back from the adjacent workpiece surface, and the tapering section (21) has a cone angle ($\alpha$) of between 80° and 120°.

14. A surgical instrument, having a machine-readable data storage medium (1) which is in the form of a two-dimensional matrix code (5) in the form of individual depressions (4) in a data section (3), characterized in that the depressions are made by a cutting work process, using drilling or milling, in a planar surface (17) which is set back from the adjacent workpiece surface, and the depressions (4) at the level of the planar surface (17) have a diameter (e) of less than 0.15 mm and a spacing (c, d) between the centers of less than 0.2 mm.

15. A surgical instrument, having a machine-readable data storage medium (1) which is in the form of a two-dimensional matrix code (5) in the form of individual depressions (4) in a data section (3), characterized in that the depressions are made by a cutting work process, using drilling or milling, in a planar surface (17) which is set back from the adjacent workpiece surface, and the distance (g) between the base (22) of the depression and the level of the planar surface (17) is less than 0.05 mm.

* * * * *